United States Patent
Noy et al.

(10) Patent No.: US 10,645,342 B2
(45) Date of Patent: May 5, 2020

(54) METHOD AND SYSTEM FOR NEW LAYOUT EXPERIENCE IN VIDEO COMMUNICATION

(71) Applicant: Polycom, Inc., San Jose, CA (US)

(72) Inventors: Ami Noy, Nir Galim (IL); Uri Avni, Moshav Ram-On (IL); Eyal Leviav, Tel Aviv (IL)

(73) Assignee: POLYCOM, INC., San Jose, CA (US)

( * ) Notice: Subject to any disclaimer, the term of this patent is extended or adjusted under 35 U.S.C. 154(b) by 0 days.

(21) Appl. No.: 15/840,919

(22) Filed: Dec. 13, 2017

(65) Prior Publication Data

US 2018/0103236 A1 Apr. 12, 2018

Related U.S. Application Data

(63) Continuation of application No. 14/719,839, filed on May 22, 2015, now Pat. No. 9,876,989.

(60) Provisional application No. 62/002,561, filed on May 23, 2014.

(51) Int. Cl.
*H04N 7/15* (2006.01)
*H04L 29/06* (2006.01)

(52) U.S. Cl.
CPC .............. *H04N 7/152* (2013.01); *H04L 29/06* (2013.01); *H04L 65/403* (2013.01)

(58) Field of Classification Search
USPC ...................................... 348/14.01
See application file for complete search history.

(56) References Cited

U.S. PATENT DOCUMENTS

| 8,125,932 | B2 | 2/2012 | Yang | |
|---|---|---|---|---|
| 2006/0215765 | A1* | 9/2006 | Hwang | H04N 7/152 375/240.21 |
| 2008/0316295 | A1* | 12/2008 | King | H04N 7/152 348/14.09 |
| 2013/0027502 | A1* | 1/2013 | Skramstad | H04N 5/265 348/14.01 |
| 2014/0267560 | A1 | 9/2014 | Bright-Thomas | |
| 2014/0269930 | A1 | 9/2014 | Robinson | |
| 2015/0103131 | A1* | 4/2015 | Denoue | H04N 7/147 348/14.03 |
| 2016/0173818 | A1 | 6/2016 | Su | |

* cited by examiner

*Primary Examiner* — Maria El-Zoobi
(74) *Attorney, Agent, or Firm* — Blank Rome, LLP

(57) ABSTRACT

A striped composed video image is disclosed, in which a main segment image is displayed with a strip of small strip segments. The strip of small strip segments is composed from a plurality of video images from a plurality of video streams. A user may pull video from the strip into the main segment. The strip of small strip segments may scrolled without affecting the main segment.

20 Claims, 6 Drawing Sheets

METHOD AND SYSTEM FOR NEW LAYOUT EXPERIENCE IN VIDEO COMMUNICATION

TECHNICAL FIELD

The present disclosure relates to video communication and more particularly to the field of combining video images from a plurality of video sources into a composed video image.

BACKGROUND ART

Videoconferencing enables individuals located remote from each other to have face-to-face meetings on short notice using audio and video telecommunications. A videoconference may involve as few as two sites (point-to-point) or several sites (multi-point). A single participant may be located at a conferencing site or there may be several participants at a site, such as at a conference room. Videoconferencing may also be used to share documents, information, and the like.

Participants in a videoconference interact with participants at other sites via a videoconferencing endpoint. An endpoint is a terminal on a network, capable of providing real-time, two-way audio/visual/data communication with other terminals or with a multipoint control unit (MCU, discussed in more detail below). An endpoint may provide speech only, speech and video, or speech, data and video communications, etc. A videoconferencing endpoint typically comprises a display unit on which video images from one or more remote sites may be displayed. Example endpoints include POLYCOM® RPD® and HDX® series, each available from Polycom, Inc. (POLYCOM, RPD, and HDX are registered trademarks of Polycom, Inc.). Such an endpoint can be referred as audio-video endpoint (AVEP). The videoconferencing endpoint sends audio, video, and/or data from a local site to the remote site(s) and displays video and/or data received from the remote site(s) on a screen.

Video images displayed on a screen at a videoconferencing endpoint may be arranged in a layout. The layout may include one or more segments for displaying video images. A segment is a portion of the screen of a receiving endpoint that is allocated to a video image received from one of the sites participating in the session. For example, in a videoconference between two participants, a segment may cover the entire display area of the screen of the local endpoint. Another example is a video conference between a local site and multiple other remote sites where the videoconference is conducted in switching mode, such that video from only one other remote site is displayed at the local site at a single time and the displayed remote site may be switched, depending on the dynamics of the conference. In contrast, in a continuous presence (CP) conference, a conferee at a terminal may simultaneously observe several other participants' sites in the conference. Each site may be displayed in a different segment of the layout, where each segment may be the same size or a different size. The choice of the sites displayed and associated with the segments of the layout may vary among different conferees that participate in the same session. In a continuous presence (CP) layout, a received video image from a site may be scaled down or cropped in order to fit a segment size.

An MCU may be used to manage a videoconference. An MCU is a conference controlling entity that may be located in a node of a network, in a terminal, or elsewhere. The MCU may receive and process several media channels, from access ports, according to certain criteria and distributes them to the connected channels via other ports. Examples of MCUs include the RMX® series of MCUs, available from Polycom Inc. (RMX series of MCUs are registered trademark of Polycom, Inc.). Some MCUs are composed of two logical units: a media controller and a media processor. A more thorough definition of an endpoint and an MCU may be found in the International Telecommunication Union ("ITU") standards, such as but not limited to the H.320, H.324, and H.323 standards. Additional information regarding the ITU standards may be found at the ITU website www.itu.int.

To present a video image within a segment of a screen layout of a receiving endpoint (site), the entire received video image may be manipulated, scaled down and displayed, or a portion of the video image may be cropped by the MCU and displayed. An MCU may crop lines or columns from one or more edges of a received conferee video image in order to fit it to the area of a segment in the layout of the videoconferencing image. Another cropping technique may crop the edges of the received image according to a region of interest in the image, as disclosed in U.S. Pat. No. 8,289,371, the entire contents of which are incorporated herein by reference.

In a CP videoconferencing session, the association between sites and segments may be dynamically changed according to the activity taking part in the conference. In some layouts, one of the segments may be allocated to a current speaker, and other segments may be allocated to other sites, sites that were selected as presented conferees. The current speaker is typically selected according to certain criteria, such as the loudest speaker during a certain percentage of a monitoring period. The other sites (in the other segments) may include the previous speaker, sites with audio energy above the others, certain conferees required by management decisions to be visible, etc.

Another type of video conferencing system is media relay conferencing (MRC). In MRC, a Media Relay MCU (MRM) receives one or more streams from each participating Media Relay Endpoint (MRE). The MRM relays to each participating endpoint a set of multiple media streams received from other endpoints in the conference. Each receiving endpoint uses the multiple streams to generate the video CP image, according to a layout, as well as mixed audio of the conference. The CP video image and the mixed audio are played to MRE's user. An MRE can be a terminal of a conferee in the session which has the ability to receive relayed media from an MRM and deliver compressed media according to instructions from an MRM. A reader who wishes to learn more about an example of an MRC, MRM or an MRE is invited to read related patent and patent application, which were published and has the U.S. Pat. No. 8,228,363 and U.S. patent application Ser. No. 13/487,703 that are incorporated herein by reference. Along the description, the terms endpoint may represent also an MRE or AVEP.

In some MRC systems, a transmitting MRE sends its video image in two or more streams; each stream can be associated with different quality level. The qualities may differ in frame rate, resolution and/or signal to noise ratio (SNR), etc. In a similar way each transmitting MRE may sends its audio in two or more streams that may differ from each other by the compressing bit rate, for example. Such a system can use the plurality of video streams to provide different segment sizes in the layouts, different resolution used by each receiving endpoint, different quality, etc. Further, the plurality of streams can be used for overcoming packet loss.

For MRC video, for example, the quality can be expressed in number of domains, such as temporal domain (frames per second, for example), spatial domain (HD versus CIF, for example), and/or in quality (sharpness, for example). Video compression standards, for example, that can be used for multi quality streams are H.264 AVC, H.264 annex G (SVC), MPEG-4, etc. More information on compression standards such as H.264, MPEG-4, can be found at the ITU Website www.itu.int, or at www.mpeg.org.

Today a verity of common communication and computing devices can be used as video conferencing endpoints. Those devices have video camera, screen, microphone and speakers and can be used as videoconferencing endpoint. For example, smartphones, tablets, notebooks, etc., with or without a touchscreen, can participant in a video conferencing session. Some of the new devices offer new human interface tools. Tools like: scroll, pulling images, etc.

In addition there are few trends in the video communication. One trend in the market is improving the quality of the video. High Definition (HD) videoconferencing systems become more and more popular. In HD system video can be presented in high resolution (1920×1080 pixels) and in high frame rate (60 frames per second), for example. Consequently, HD videoconferencing system requires more computing resources and network resources.

Another trend in the video communication market is video-on-demand (VOD) that is served by a video services provider, such as but not limited to a cable TV (CTV) operator or an Internet TV service provider or an Internet service provider (ISP) that delivers video on demand services such as YouTube for example. Along the discloser the term VOD services, CTV, ISP of video streaming, can be used interchangeably. In such embodiments a TV receiver such as set top box, a computing device with communication capabilities over in IP network, or a mobile phone can be used as a video terminal. VOD services allow a user of a video terminal to communicate with the CTV operator and request to obtain a certain TV program. In many cases the user may jump from one program to the other looking for an interesting program. Usually jumping is done between similar stations such as sport stations, or news, or action, etc. While jumping from one channel to other the user may miss information such as a touchdown that is currently broadcast by another channel, for example.

Adapting videoconferencing technique to the new trends of computing devices and video communication would be beneficial and be appreciate by users of those systems.

SUMMARY OF INVENTION

The needs that are described above are not intended to limit the scope of the inventive concepts of the present disclosure in any manner. The needs are presented for illustration only. The disclosure is directed to a novel technique for presenting new layouts of a CP video image, selecting endpoints to be presented in the layout and improving the utilization of computing and network resources for handling HD images. For embodiments of the present disclosure that relate to TV broadcasting, the term CP video image can be used to describe a composed video image that is composed from video images obtained from a plurality of video sources.

Furthermore, although specific exemplary embodiments are described in detail to illustrate the inventive concepts to a person skilled in the art, such embodiments are susceptible to various modifications and alternative forms. Accordingly, the figures and written description are not intended to limit the scope of the inventive concepts in any manner.

The foregoing summary is not intended to summarize each potential embodiment or every aspect of the present disclosure, and other features and advantages of the present disclosure will become apparent upon reading the following detailed description of the embodiments with the accompanying drawings and appended claims.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Figure 1A:
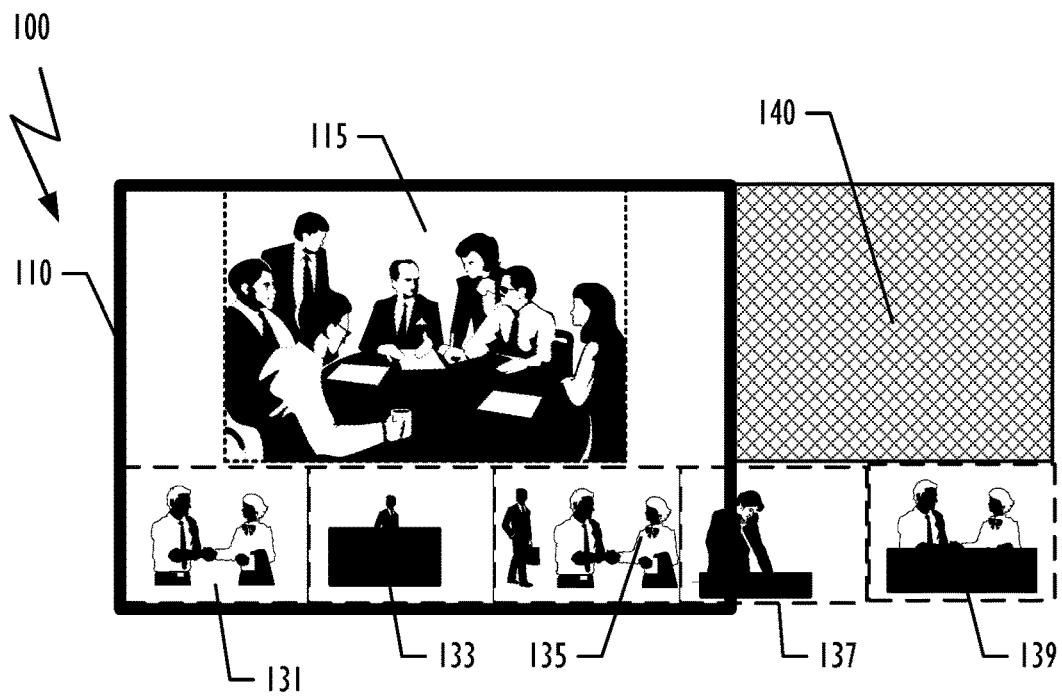
FIG. 1A illustrates a snapshot of an example of a runoff CP (ROCP) video image, which is composed from a upper portion of ROCP including the speaker segment, a strip of video images and a padding segment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system.

Although some of the following description is written in terms that relate to software or firmware, embodiments may implement the features and functionality described herein in software, firmware, or hardware as desired, including any combination of software, firmware, and hardware. In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on a computer readable medium such as a read/write hard disc, CDROM, Flash memory, ROM, or other memory or storage, etc. In order to execute a certain task a software program may be loaded to an appropriate processor as needed. In the present disclosure the terms task, method, process can be used interchangeably.

Example of embodiments of the present disclosure offer new techniques for building new layouts with new human interface tool for controlling the layout and the presented images in a CP video image. The new layout can be referred as a runoff CP (ROCP) layout for a CP video image. An example of ROCP layout may comprise an upper portion having a speaker segment in which a selected participant can be presented. The selected participants can be the current speaker, the previous speaker, etc. The reset of the conferees can be presented in a strip of small segments below the upper segment. Each video segment in the strip can be associated with a conferee that participant in the session. The dimension of the strip can be greater than the corresponding dimension of the screen of the endpoint. So, for example, the strip can be wider than the width of the screen of the endpoint; the number of pixels of the width of the strip can be larger than the number of pixels in the screen of the endpoint. The width of the strip may runoff the width of the display. Consequently part of the strip will be invisible. Along the disclosure and the claims the verbs compose a video image from two or more video images or build a video image from two or more video images can be used interchangeably.

Some example embodiments of the novel technique are configured to accept strip instructions from a user for scrolling the strip in order to present other one or more segments that are currently invisible. In some embodiments a user can replace the image of a conferee that is presented in the speaker segment with an image of a conferee that is presented in one of the small segments along the strip.

In embodiments in which the endpoint is a touchscreen device, the user can touch the relevant image in the strip and pull it toward the speaker segment; or the user can touch an image in the strip and pull it to the left or to the right in order to scroll a horizontal strip to reveal invisible segments. User of endpoints that do not have a touchscreen can use the cursor and the arrows keys for selecting and moving the images along the screen, for example.

In some embodiments, moving the images of the strip while keeping the flowing of the video images in each of the segments of the strip can be implemented within the endpoint without interrupting with an MCU. Yet in some embodiment, moving an image of a conferee from a small segment of the strip to the speaker segment, while keeping the flowing of the video images in each of the segments of the strip, may require an interaction with the MCU.

In some embodiments, an example of MCU can be configured to build a frame of a ROCP video image in which the width of the CP video image is equal to the width of the strip, which is larger than the width of the screen of a receiving endpoint. While the height is similar to the height of the screen of the receiving endpoint, the height of the strip plus the height of the speaker segment, for example. The area of the CP video image can comprise three sub areas. The top left area can be allocated to the video image of the conferee that will be presented in the speaker segment; the top right area can present a fix color, padding data, which will be invisible. The bottom area of the CP video image can comprise the strip with a plurality of small segments; each is associated with one of the conferees.

It is well known to a person with ordinary skill in the art that a frame memory or a frame buffer is a portion of a random access memory (RAM) that contains a complete video frame of data. The data typically consists of color values for every pixel on the screen. The total amount of the memory required to drive the frame buffer depends on the resolution of the output signal, and on the color depth and palette size. Usually two or more frame memory are used for enabling writing (storing data) data of a next frame into a first frame memory while reading data of a current presented frame from the second frame memory.

In some embodiments a horizontal strip with a plurality of small segments can be located at the top area of the CP video image. In other embodiments a vertical strip can be presented at the left or right side of the CP video image with a plurality of small segments. In such embodiment the scrolling can be done by scrolling or dragging the strip up or down.

A receiving endpoint can be configured to decode the obtained CP video image and store it in a first frame memory a ROCP frame memory. Next an image builder can build a presented CP video image that will include a speaker segment and a portion of the strip while the other portion of the strip will be invisible. The selected portion of the strip can be defined by a controller that will follow the instruction received from the user of the receiving endpoint.

In some embodiments of the disclosed system an MCU can be configured to allocate two or more encoders per one or more of receiving endpoints. A first encoder can be allocated to encode (compress) a video image of a selected conferee that will be presented in a speaker segment, while the second encoder can be allocated to compress the video images of the conferees that are presented in the small elements along the strip. The compressed video images from both encoders can be transmitted toward a receiving endpoint.

Sending two different compressed images (streams) can be according to RFC 5285 ("A General Mechanism for RTP Header Extensions") with/without RFC 5888 ("The Session Description Protocol (SDP) Grouping Framework") and with/without draft-holmberg-mmusic-sdp-bundle-negotiation-00.txt ("Multiplexing Negotiation Using Session Description Protocol (SDP) Port Numbers"), for example.

By implementing those standards, an MCU and an endpoint can commence a SIP call for more than one video streams. Video streams can be bundled together on the same UDP/TCP port but also can use different ports. A reader who wishes to learn more about SIP is invited to visit the IETF web site at www.ietf org.

At the receiving side, an endpoint can be configured to decode the obtained two streams, stores each decoded stream in a frame memory. Video data of the upper portion can be stored in an upper portion frame memory (UPFM) and the Video data of the segments of the strip can be stored in a strip frame memory (SFM). Next an image builder can build a presented CP video image that will include the speaker segment and a portion of the strip while the other portion of the strip will be invisible. The selected portion of the strip can be defined by a controller that will follow the instruction received from the user of the receiving endpoint.

In such embodiments, using two pairs of encoder/decoder at the MCU/endpoint (respectively) computing and network resources can be saved by defining different compression parameters per each pair, stream. The pair that is associated with the speaker segment can be configured to use high frame rate (60 frames per second) and high quality parameters (sharpness, for example), while the pair that is associated with the strip can be adapted to compress low frame rate (15 or 30 frames per second). Such configuration reduces the resources that are needed for handling (compression/decompression) of the strip as well as network resources for carrying the data of the strip. In addition if an intra request from one of the endpoint is received, then the responded Intra frame will require less computing and network resources.

In other embodiments, an endpoint is configured to deliver the MCU scroll or pull instructions. The instruction can be delivered inbound or outbound. Some embodiments may use the Far End Camera Control (FECC) channel in order to deliver the user's strip commands. Yet in other embodiments the instructions can be transferred outbound over dedicated connection, for example. The dedicated connection can be an UDP/IP connection, for example. The MCU can be configured to respond to the instructions by composing a new layout according to the pull or scroll instructions.

In some embodiments a virtual ROCP frame memory (VROCPFM) can be used. A VROCPFM may comprise a map of addresses of a RAM in which data related to the different video images from the upper portion of the ROCP as well as the small segment of the strip are stored. A builder device can be configured to accept the user's strip commands (such as but not limited to scroll, pull, etc.) and accordingly can process the addresses from the map and retrieve the video data of the appropriate video image in order to place it in a CP video frame to be presented. Along the disclosure the terms command or instruction can be used interchangeably.

Yet an alternate embodiment of the present disclosure in which MRC system is used, an MRM can be configured to deliver a plurality of streams that will carry the compressed video data of the upper portion and the compressed video data of the plurality of the small segments of the strip.

At the receiving side, an MRE can be configured to decode the obtained plurality of streams, stores each decoded stream in a frame memory. Video data of the speaker segment can be stored in an UPFM and the Video data of the segments of the strip can be stored in a strip frame memory (SFM). Next an image builder can build a presented CP video image that will include the speaker segment and a portion of the strip while the other portion of the strip will be invisible. The selected portion of the strip can be defined by a controller that will follow the instruction received from the user of the receiving endpoint.

The disclosed embodiments are configured to prepare a presented strip CP (SCP) video image that complies with the parameters of a display unit of a receiving endpoint (REP). The presented SCP can comprise the decoded video image which matches the speaker segment and a presented portion of the strip. The presented portion of the strip can comply with a strip command that was gave by a user of the REP. Adapting the presented portion of the strip to the user command can be performed in a rate that matches the frame rate of the strip giving the experience that video images of the strip constantly running while responding to the user's strip command.

Some embodiments, which are adapted to operate in a TV broadcasting, a server that can be installed in a TV operator's premises, such as CTV operator, or a video server in ISP premises, can be configured to build one or more TV strip composed (TVSC) video image. Each TVSC video image can include a main segment and a strip of small segments. The image in the main segment can reflect the video stream from a main channel (station) which is the last selection of the user. Each one of the small segment presents a stream of video images that is obtained from another channel from similar type of context, sport, action, family, news, etc.

A user that has a VOD services can use his TV controller for pointing on one of the small video images and uses one of the arrows bottoms to point to the left or right for scrolling the strip in order to move to the channels and see their video in the small segments. Pulling the small image up, toward the main segment will switch between the video streams that are presented in the small segment with the one that is presented in the main segment. Scrolling the strip images or switching the main stream is implemented without disturbing the flowing of the video images in each of the segments of the TVSC video image. A user that surf the Internet can use the key board or a touch screen, etc.

The TV server can perform similar actions as the actions that is employed by an MCU that is configured to obtain the user's strip command and construct the presented strip CP video image to be delivered to the user's terminal. There are few differences between combining the streams in video conferencing and in TV broadcasting. In video conference, the audio of the speaker, the one that is presented in the main segment is mixed with the audio of other participants. In TV broadcasting there in no reason to mix the audio since there is no connection between the different sources of the video/audio streams. Therefore the audio that is transmitted is the audio that was obtained from the same source as the source of the video that is presented in the main segment. In addition, in video conferencing the MCU respond to changes in the video session. Changes such as a new speaker, adding a conferee, etc. When such a change occurs, the MCU may change between sources of video images that are presented in the main segment and in one of the segments of the strip. In some TV systems, only the user can change between presented video sources, while the TV server just respond to those command. These and other aspects of the disclosure will be apparent in view of the attached figures and detailed description.

FIG. 1A illustrates a snapshot 100 of an example of a runoff CP (ROCP) video image before encoding it by an encoder of an MCU and transmitting it toward a targeted audio-video endpoint (AVEP). A ROCP video image is a video image that is larger than the frame size of a display unit of the targeted AVEP. In an embodiment that displays a horizontal strip of small segments at the top or the bottom of the display unit, the width of the ROCP is larger, has more pixels, than the width (W) of the screen of the targeted AVEP, as illustrated by the example snapshot 100. In an embodiment, which displays a vertical strip at the left or right sides of the display unit, the height of the ROCP is larger, has more pixels, than the height (H) of the screen of the targeted AVEP. The snapshot 100 illustrates decoded video data stored in a frame memory at the output of an editor of a video output module of an MCU before encoding (compressing) the ROCP video image. The editor is configured to collect decoded video data of a plurality of input video modules. Each input video module is associated with a transmitting AVEP that participant in the session.

The example snapshot 100 of a ROCP video image can comprise a speaker segment 115 that represents the video image of a current speaker, for example. A horizontal strip of small elements at the bottom of the ROCP 100 and a padding segment 140 at the top left corner of the ROCP 100 snapshot. The rectangle 110 drawn by the widest line represents the frame size of the targeted AVEP.

The padding segment 140 can present still data of a fix color, which will be invisible and will consume minimal computing (encoding/decoding) and network resources. The size W×H (number of pixels in the width and the height, respectively) of the padding segment 140 is defined by the MCU in order to complete the shape of the ROCP image to a rectangle that includes all the small segments of the strip, for example.

The illustrated strip comprises five small segments 131, 133, 135, 137 and 139, for example. Each small segment can be associated with a transmitting AVEP from the reminding AVEPs that participant in the session but are not selected as the current speaker. The size and number of small segments in the strip can be depended on the number of conferees in the session, for example. In some embodiments the number of small segment and their size can be defined by the user of the targeted AVEP.

Figure 1B:
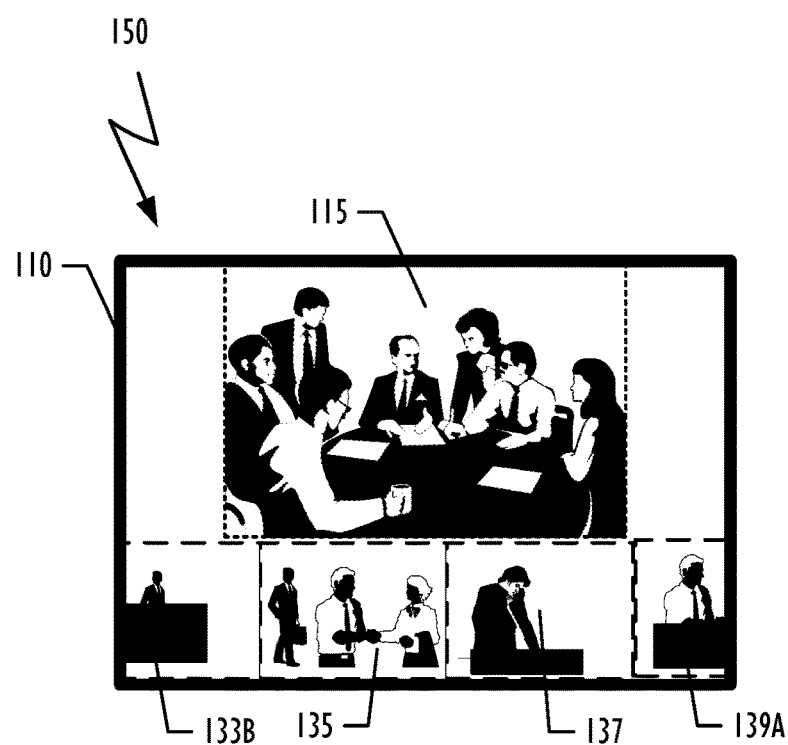
FIG. 1B illustrates a snapshot of an example of presented strip CP (SCP) video image that is presented over a screen of an endpoint in which the video image of a selected conferee, which is presented in the speaker segment, and a visible portion of the strip, which is presented below the speaker segment.

FIG. 1B illustrates a snapshot 150 of an example of a decoded video data of a CP video image stored in a frame memory before being presented on a display unit of the targeted AVEP. The snapshot 150 presents portions of the ROCP video image 100 of FIG. 1A after being manipulated in order to fit the frame size 110 of the display unit of the targeted AVEP and in response to the last strip instruction, received from the user of the targeted AVEP, and is related to the strip. Snapshot 150 includes the speaker segment 115 and a portion of the horizontal strip that comply with the user strip instruction. The presented portion of the horizontal strip includes, from left to right, the right portion 133B of segment 133 (FIG. 1A), the entire segments 135, 137, and the left portion 139A of segment 139 of FIG. 1A. By comparing the snapshot 100 of ROCP video image of FIG. 1A and the snapshot 150 of FIG. 1B the reader can see that the invisible segment 140 of FIG. 1A is not presented in FIG. 1B and will not be presented to the user of the targeted AVEP.

The last strip instruction of the user, which leads to snapshot 150, was scrolling, dragging the strip to the left. The instruction could be given by touching one of the small video images and pulling it to the left, for example. In other embodiment the instruction can be given by using the arrows keys of the control unit of the AVEP. In response to the instruction "scroll left" the video images of the strip were moved, scrolled, to the left. Consequently, the video image of segment 131 and the left portion of segment 133 were scroll out and are not included in the snapshot 150. Segment 133 was dragged to the left, in response the left portion of segment 133 become invisible, while the right portion of the video image that fit the right portion 133B of segment 133 is presented in snapshot 150. The video image of the conferee that is associated with segment 135 was moved to the left compare to the snapshot 100. The entire video image of the conferee that is presented in segment 137 was moved to the left into the rectangle 110 and be presented in the CP video image of snapshot 150. Finally, the video image of the conferee that is associated with the segment 139 of FIG. 1A was moved to the left, and be divided into two parts. The left part of it, 139A, is included in the presented rectangle 110, consequently only the left portion 139A of the video image of its associated conferee is presented and the right segment remains invisible.

In some embodiments of the current disclosure an MCU is configured to build the ROCP video image 100 and deliver compressed ROCP video data toward a targeted AVEP. The targeted AVEP is configured to obtain the compressed video data of the ROCP video image, decode it and manipulate the decoded video according to the scrolling or pulling command in order to build the appropriate CP video image that is represented by the snapshot 150.

In some embodiment of a CTV system, a set top box that is associated with a TV terminal can be configured to obtain a runoff TV strip composed (ROTVSC) video image, which is larger than the width of the screen of the video terminal. The set top box can be configured to execute similar actions as the AVEP that obtains a ROCP video image. A CTV system is used as an example TV system that can deliver VOD. A satellite TV with phone connection can act in a similar way. Or a computing device, or mobile phone that surf the Internet can be adapted to operate in a similar way.

In other embodiments, a targeted AVEP is configured to transfer the scroll or pull command to the MCU. In response to the command, the MCU is configured to create and deliver the compressed video data as presented in the CP video image of snapshot 150. More information about the creation of snapshots such as 110 and 150 is disclosed below in conjunction with FIGS. 3, 5, and 6.

In some embodiment of a CTV system, a set top box that is associated with a TV terminal can be configured to deliver the strip commands toward the TV server. The TV server can be configured to respond by delivering the presented TVSC video image using similar actions as the actions of the relevant embodiment of the MCU. In IP services the mobile phone or the computing device can be adapted to preform similar tasks as the AVEP. Along the disclosure and the claims the terms a presented CP video image, a presented TVSC or a strip composed video image (SCVI) can be used interchangeably for referring to a composed video image that comprise a main segment and a strip of small segment along one of the edges of the composed video image. The snapshots 150 (FIG. 1B) as well as 250 (FIG. 2B) represent an example of such strip composed video image. The video images and the segments of the strip responding to strip commands obtained from a user terminal.

Figure 2A:
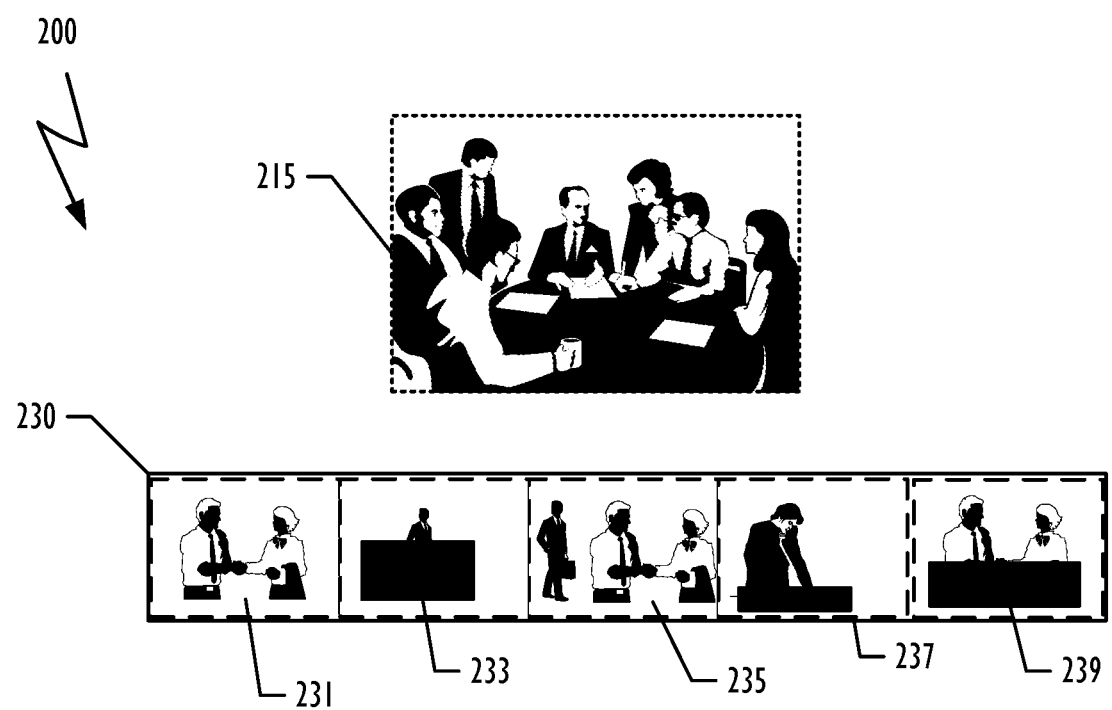
FIG. 2A illustrates a snapshot of an example of the video data created in an embodiment of an MCU in which two encoder are used at an MCU.

FIG. 2A illustrates a snapshot 200 of two frames 215 and 230 of video images before encoding them by two encoders of an MCU and transmitting the compressed video data of the two frames 215 and 230 in one or more streams toward a targeted AVEP. Wherein the targeted AVEP was configured to process those two compressed video frames and compose a CP video image comprises the speaker segment 215 and a portion of the horizontal strip 230. Sending two different compressed images (streams) can comply with RFC 5285 ("A General Mechanism for RTP Header Extensions") with/without RFC 5888 ("The Session Description Protocol (SDP) Grouping Framework") and with/without draft-holmberg-mmusic-sdp-bundle-negotiation-00.txt ("Multiplexing Negotiation Using Session Description Protocol (SDP) Port Numbers"), for example. By implementing those standards, an MCU and an endpoint can commence a SIP call for more than one video streams. Video streams can be bundled together on the same UDP/TCP port but also can use different ports.

The presented portion of the strip complies with the last scroll/pull command that was given by the user of the targeted AVEP. In an embodiment that displays the strip of small segments at the top or the bottom of the display unit, the width of the horizontal strip 230 can be larger, has more pixels, than the width (W) of the screen of the targeted AVEP, as illustrated by the example snapshot 200. In an embodiment, which displays the strip at the left or right sides of the display unit, the small segment of the strip are arranged from up to down, from the reader point of view. In such embodiment, the height of the strip can be larger, has more pixels, than the height (H) of the screen of the targeted AVEP.

The snapshot 200 illustrates decoded video data stored in two frame memories at the output of an editor of a video output module of an MCU before encoding (compressing) the video data of those two frame memories. An editor module of such an MCU can be configured to collect decoded video data of the current speaker, crop and scale it to the size (W×H pixels) that fits the speaker segment 215, which was allocated to the current speaker, and store the data of the scaled decoded video frame in a first frame memory that fits the segment 215. In addition the editor can be configured to collect decoded video data from a plurality of input video modules. Each input video module is associated with a transmitting AVEP that participant in the session and was not been selected as the current speaker. In the illustrated example of FIG. 2A the strip frame 230 comprises five small segments 231, 233, 235, 237 and 239. The encoding of the strip 230 can be in lower frame rate and/or bit-rate, and/or quality than the encoding of the segment 215 of the current speaker.

Each small segment 231, 233, 235, 237 and 239 can be associated with a transmitting AVEP from the reminding AVEPs that participant in the session but are not selected as the current speaker. The size and number of small segments in the strip can depend on the number of participants, for example. In some embodiments the number of small segment and their size can be defined by the user of the targeted AVEP.

Some embodiments of the disclosed system that are configured to operate in video broadcasting such as CTV, a sever in the video service provider, such as but not limited to CTV operator, can be adapted to create the two compressed video streams in a similar way to the disclosed MCU. In embodiments that operate in an ISP premises, a video server that deliver requested video streams can be adapted to create the two streams the one that carries the compressed video image 215 and the one that carries the compressed video image of the composed strip 230-239.

Figure 2B:
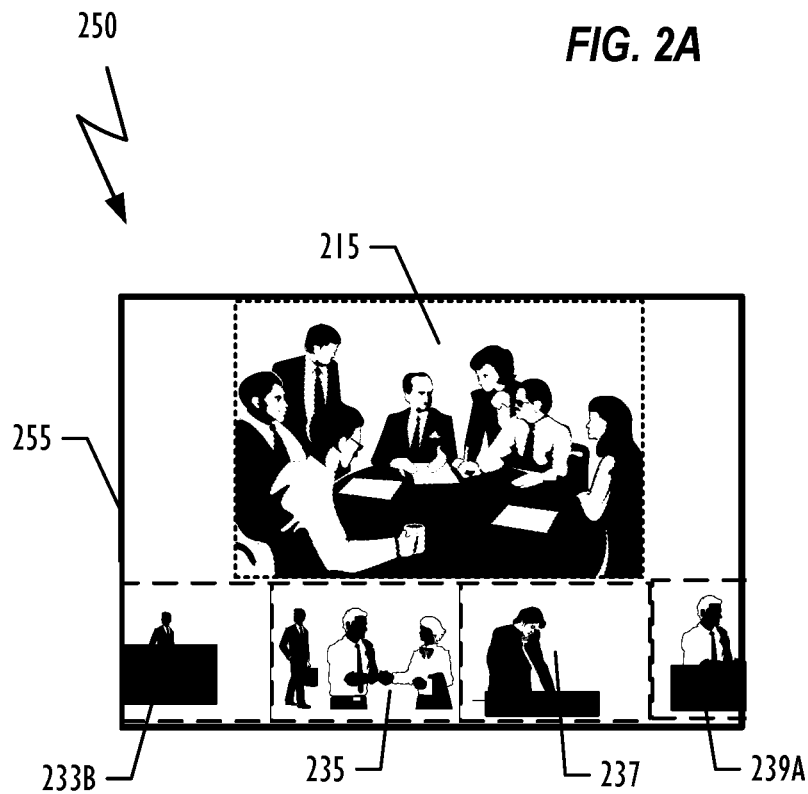
FIG. 2B illustrates a snapshot of an example of a presented SCP video image that is presented over a screen of an endpoint in which two decoders are used.

FIG. 2B illustrates a snapshot 250 of an example of a decoded video data of a CP video image 255 stored in a frame memory before being presented on a display unit of the targeted AVEP. The CP video image 255 comprises the decoded data of the video image of the current speaker 215 located at the center of the upper portion of the frame 255. The lower section of the CP video image 255 may comprise a portion of the horizontal strip that complies with the last user instruction. The presented portion of the horizontal strip includes, from left to right, the right portion 233B of segment 233, the entire segments 235, 237, and the left portion 239A of segment 239 of FIG. 2A.

As for the example of FIGS. 1A and 1B, the last instruction of the user, which leads to snapshot 250, was scrolling the horizontal strip to the left. The instruction could be given by touching one of the small video images and pulling it to the left, for example. In other embodiment the instruction can be given by using the arrows keys of the control unit of the AVEP. In response to the instruction "scroll left" the video images of the horizontal strip were moved, scrolled, to the left. Consequently, the video image of segment 231 and the left portion of segment 233 were scroll out and become invisible in the snapshot 250. Segment 233 was scroll to the left, in response the right portion of the video image that fit the right portion 233B of segment 233 is presented in snapshot 250. The video image of the conferee that is associated with segment 235 was moved to the left compare to the snapshot 200. The entire video image of the conferee that is presented in segment 237 was moved to the left be presented in the CP video image 255 of snapshot 250. The video image of the conferee that is associated with the segment 239 of FIG. 2A was moved to the left and was divided to two. Only the left part of it 239A is included in the presented CP video image 255, consequently only the left portion 239A of the video image of its associated conferee is presented, while the right portion of segment 239 remains invisible.

In some embodiments of the current disclosure an MCU is configured to build the full strip 230, which is larger than the width of the frame of the targeted AVEP. In such embodiment the targeted AVEP is configured to decode the compressed strip 230 and selects the relevant section of it in order to comply with the scrolling or pulling command for composing the appropriate CP video image 255 that is represented by the snapshot 250.

Some embodiments of the disclosed system that are configured to operate in video broadcasting such as CTV, such as but not limited to CTV operator, a set top box can be adapted to process the two compressed video streams based on strip commands from the control unit, in a similar way to the above disclosed AVEP. In embodiments that operate in an ISP premises, a computing device, such as laptop or a smart phone, can be adapted to process the received two streams, the one that carries the compressed video image 215 and the one that carries the compressed video image of the composed strip 230-239. Such computing device can be adapted to process the two compressed video streams based on strip commands from the tablet or the touch screen, in a similar way to the above disclosed AVEP in order to present a video image similar to the snapshot 255. More information about the creation of snapshots such as 200 and 250 is disclosed below in conjunction with FIGS. 4, 5, and 6.

Figure 3A:
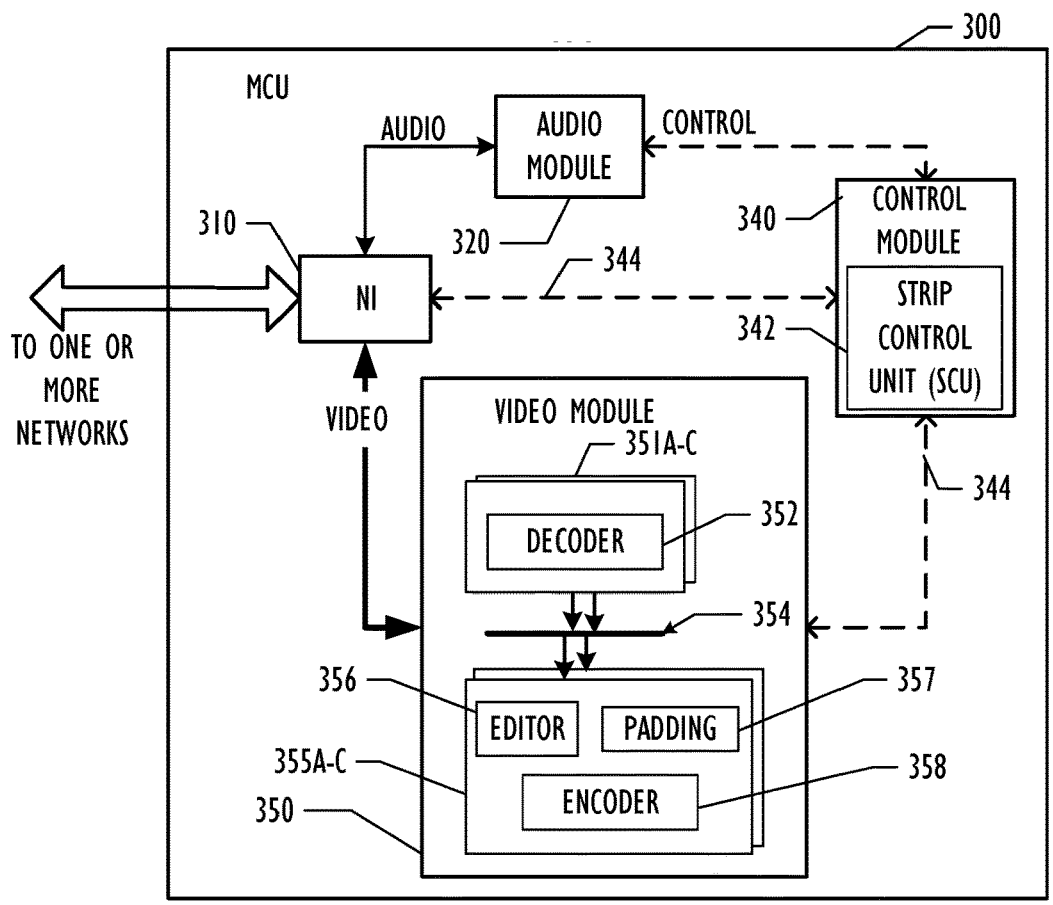
FIGS. 3A and 3B depict a block diagram with relevant elements of example embodiments of an MCU using a single encoder per layout and an endpoint using a single decoder.
Figure 3B:
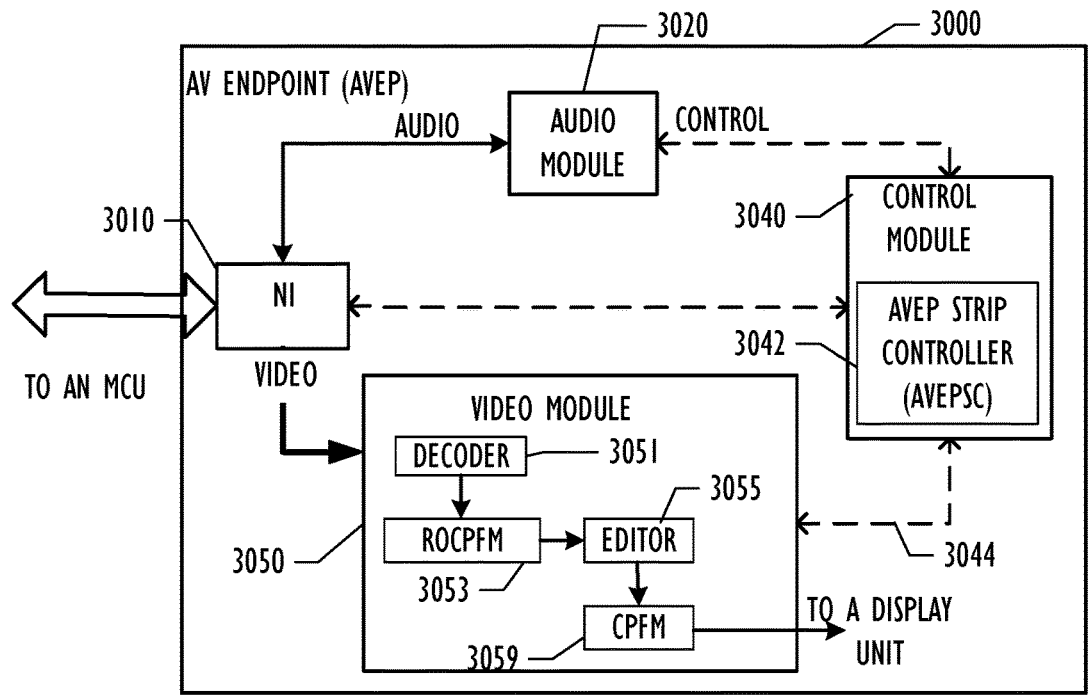

Referring now to FIGS. 3A and 3B that illustrates a block diagram with relevant elements of example embodiments of an MCU 300 that uses a single encoder per layout and an AVEP 3000 that uses a single decoder. MCU 300 is capable of implementing aspects of the disclosed methods for controlling a strip of small images in a CP video image. The strip can be a vertical strip or a horizontal strip. The disclosed examples are related to a horizontal strip. However, adapting the disclosed technique to handle a vertical strip is obvious to a person with ordinary skill in the art in view of the described techniques. An example embodiment of MCU 300 may comprise one or more processors, computer readable medium such as a read/write hard disc, CDROM, Flash memory, ROM, or other memory or storage devices, etc. Software of a logical module may be embodied on one of the computer readable medium. In order to execute a certain task, a software program may be loaded to an appropriate processor as needed.

MCU 300 may include a network interface module (NI) 310, an audio module 320, a control module 340 and a video module 350. The network interface module 310 receives communication from a plurality of endpoints via one or more networks (not shown in the figures). Network interface 310 processes the communication according to one or more variety of communication standards such as but not limited to H.320, H.323, SIP, etc. and compression standards such as H.261, H.263, H.264, H.265, G711, G722, etc. Network interface 310 can receive and transmit control and data information to/from other MCUs and endpoints. More information concerning the communication between the endpoint and the MCU over the relevant network and information that describing signaling, control, compression, and setting a video call can be found in the international telecommunication union (ITU) standards H.320, H.321, H.323, H.261, H.263, H.264, H.265, etc. and SIP.

Network interface module 310 multiplexes/de-multiplexes the different signals, media and/or "signaling and control", that are communicated between the endpoints and the MCU. The compressed audio signal is transferred to and from the audio module 320. The compressed video signal is transferred to and from video module 350 and the "control and signaling" is transferred to and from control module 340. Furthermore, in an embodiment in which the MCU receives user's strip commands such as but not limited to scrolling and pulling command from the endpoint, then the network interface module 310 can be capable of handling the strip command related information that is transferred between the control module 340 and the endpoint.

The strip command can be delivered inbound or outbound. Some embodiments may use the FECC channel in order to deliver the user's strip commands inbound. Yet in other embodiments the strip commands can be transferred outbound over dedicated connection, for example. The dedicated connection can be an UDP/IP connection, for example. The MCU can be configured to respond to the strip commands by composing a new layout according to the pull or scroll instructions, for example.

Audio module 320 may receive, via network interface 310 and the audio line, compressed audio streams from the plurality of endpoint. The audio module 320 decodes the compressed audio streams, analyzes the decoded streams, selects certain streams and mixes the selected streams. Then the mixed stream is compressed and the compressed audio stream is sent via the audio line back to the network interface 310 which sends the compressed audio streams to the different endpoints. Audio streams that are sent to different endpoints can be different. For example the audio stream can be formatted according to the different communication standard and according to the needs of the individual endpoint. Audio stream may not include the voice of the user associated with the endpoint to which the audio stream is sent. However, the voice of this user can be included in all other audio streams. Audio module 320 can be adapted to analyze the received audio signals from the endpoints and determined the energy of each audio signal. Information on the signal energy can be transferred to the control module 340. The energy level can be used as a selection parameter for selecting appropriate one or more endpoints as the source of the mixing of the audio and/or the video of the conference. The endpoints can be referred as selected endpoints or presented endpoints.

Video module 350 receives compressed video streams from the plurality of endpoints (not shown in the figures), which are sent toward the MCU 300 via relevant network (not shown in the figures) and processed by network interface 310. Video module 350 can create one or more compressed CP and ROCP video images according to one or more layouts that are associated with one or more conferences currently being conducted by the MCU 300. An example of video module 350 can have a plurality of input modules 351A-C, a plurality of output modules 355A-C and a video common interface 354. Each input module 351A-C can be associated with an endpoint. Each output module 355A-C can be associated with one or more endpoints that can receive and process a similar CP or ROCP video image.

Control module 340 can be a logical unit that controls the operation of the MCU 300. In addition to common operation of a typical MCU, MCU 300 is capable of additional functionality as result of having control module 340. Control module 340 can include an example of a strip control unit (SCU) 342. In an example embodiment of an MCU 300, in which the MCU is configured to deliver a ROCP video image such as the snapshot 100 of FIG. 1A, the SCU 342 can be capable of instructing the one or more output module 355A-C which decoded video data to obtain from the common interface 354, how to crop and scale it and in which segment of the ROCP layout to place the obtained decoded video data.

In addition the SCU 342 can be capable of informing the relevant endpoint about changes in the conferees that are presented in a small segment of the strip. This indication may be needed in case that the change in the strip is related to a segment that is currently invisible in the relevant endpoint. The indication may prompt the user to scroll the strip in order to see the changes.

Further, in such embodiment of an MCU the SCU 342 can be configured to get indication from an endpoint that the user of that endpoint pulls one of the images from the strip toward the speaker segment 115 (FIG. 1B). Upon receiving such an indication via the NI 310, the SCU 342 can instruct the relevant output module 355A-C to switch between the video image that is currently presented in the speaker segment 115 with the video image of the conferee that was pulled out from the strip. In such a case an Intra frame that reflects the new setup can be prepare and sent by the relevant output module 355.

In example embodiments of MCU 300 in which the MCU delivers a CP frame 150 such as the one that is illustrated in FIG. 1B, the SCU 342 can be capable of obtaining, from an endpoint via NI 310, one or more strip commands, such as but not limited to scroll, pull, etc. In such embodiment the SCU 342 can be configured to process the obtained strip command and accordingly can instruct the relevant output module 355A-C how to crop, scale and place each one of the decoded video images that are obtained from the common interface 354 in the CP video image 150 that comply with the obtained strip command. More information on the operation of SCU 342 is disclosed below in conjunction with FIG. 5.

Returning now to describe the elements of the video module 350 of the exemplary MCU 300. Exemplary input module 351A-C can include among other elements a decoder 352. The decoder 352 receives compressed video from an associated endpoint. An associated endpoint is an endpoint that is associated with the relevant input module 351. The decoder 352 decodes the compressed video into decoded video data. The decoded information is stored in a decoder frame memory from which it is transferred toward one or more output modules 355A-C via common interface 354.

Among other elements, an exemplary output module 355A-C may include an editor 356 a padding generator 357 and an encoder 358. Editor 356 can be capable of getting decoded data of video images from the common interface 354 to be composed into a frame of a ROCP video image, such as ROCP 100 that is presented in FIG. 1A. In addition the editor 356 can be configured to fetch a padding frame such as padding segment 140 from the padding generator 357. The editor 356 may scale, crop, and place the video data of each of the conferees into an editor frame memory according to the location and the size of the image in the ROCP layout. Such an editor frame memory can be referred as ROCP frame memory. The size of each video image and the location is defined based on command that is received from the SCU 342 in response to the user's strip commands. The editor is configured to build the ROCP video frame in a rate that matches the presented rate of the receiving endpoint.

The padding generator 357 is configured to create the padding segment 140 for example. The padding segment can present still data of a fix color, which will be invisible and will consume minimal computing (encoding/decoding) and network resources. The size W×H of the padding segment is defined by the MCU in order to complete the shape of the ROCP image to a rectangle that includes all the small segments of the strip.

In some embodiment the padding generator can be a padding frame memory that matches the padding segment. The padding frame memory can be allocated by SCU 342 and be filled with still data by the SCU 342. The editor 356 can be configured to fetch the padding data from the padding frame memory and place it in the ROCP frame memory. Yet, in other embodiments the editor 356 can be configure to create the padding segment instead of the padding generator 357. In such embodiment the editor 356 can be configured to allocate in the ROCP frame memory a section for the padding segment and keep it still as long as the layout remains without changes. In such embodiment the video output module 355A-C does not include the padding generator 357 as a separate module.

In some embodiments the MCU 300 can be configured to deliver the presented CP video image such as 150 that is illustrated by FIG. 1B. The presented CP video image complies with the parameters of a display unit of a receiving endpoint (REP). In such embodiment the editor 356 can be configured to allocate an editor frame memory that matches the presented CP video image 150. Such an editor may obtain, from the common interface 354, the selected decoded video data of the video image that is associated with the speaker segment 115. In addition the editor 356 can obtain the decoded video data of the images that belong to the presented portion of the strip, images that associated with the segments 133, 135, 137 and 139, for the example of FIG. 1B.

Obtaining the appropriate images can be defined by instructions received from the SCU 342 in response to the user's strip commands. The instructions can include the location of each of the strip images and the starting point of the visible portion of the left and right segments (133, 139 respectively). The obtained video data of each pixel that belong to the strip can be stored in appropriate location of the editor frame memory that reflects the presented CP frame 150. Video data of pixels of the strip that belongs to the invisible section of the strip will not be stored in the presented CP frame memory. Pixels that are presented in the example of FIG. 1A such as the one that belong to segment 131, left portion of segment 133 and right portion of segment 139 becomes invisible in the example snapshot 150 of FIG. 1B.

When the editor frame memory is ready with all the selected conferee's images, the image of the speaker segment and the small segments of the strip, the data in the frame memory is ready to be encoded, the encoder 358 can start encoding (compressing) the stored video data from the editor frame memory. The compression can comply with the compression standard and parameters as defined during negotiation with the REP. The common interface 354 may include any of a variety of interfaces, such as but not limited to shared memory, ATM bus, TDM bus, switching and direct connection, etc. ATM stands for Asynchronous Transfer Mode, TDM stands for time division multiplexing.

Some embodiments, which are adapted to operate in a TV broadcasting, a server that can be installed in a TV operator's premises, such as CTV operator, or a video server in ISP premises, can be configured to build one or more TV strip composed (TVSC) video image. Some embodiments of such a video server can include a video module similar to video module 350. In such embodiments, obtained compressed video streams can be received from a plurality of TV stations, channels, or from a plurality of compressed video files from one or more websites. An output module similar to 355A-C can be allocated per each CTV set top box that is currently uses the video server, or a computing device, such as smartphone for example, that currently visits the relevant video server.

FIG. 3B illustrates a block diagram with relevant elements of example embodiments of an audio-video endpoint (AVEP) 3000 that comprises a single decoder. The illustrated example of endpoint 3000 is adapted to process a receiving compressed ROCP video image from an MCU such as the example of MCU 300 FIG. 3A. An example embodiment of endpoint 3000 may comprise one or more processors, computer readable medium such as a read/write hard disc, CDROM, Flash memory, ROM, or other memory or storage devices, etc. Software of a logical module may be embodied on one of the computer readable medium. In order to execute a certain task, a software program may be loaded to an appropriate processor as needed.

The endpoint 3000 is capable of obtaining the compressed ROCP video image, which is larger than the frame size of the display unit that is associated with the endpoint 3000, decoding the compressed video, processing the decoded data of ROCP video image in order to create a presented CP video image with a strip according to a last strip commands received from a user of the endpoint. An example of presented CP video image is illustrated by snapshot 150 of FIG. 1B. The presented CP video image can be delivered to the display unit (not shown in the drawings) of the endpoint 3000.

An example of endpoint 3000 can comprise a network interface (NI) 3010, an audio module 3020, a control module 3040, and a video module 3050. The NI 3010 can communicate with an MCU or another endpoint via one or more networks (not shown in the figures). Network interface 3010 processes the communication according to one or more variety of communication standards such as but not limited to H.320, H.323, SIP, etc. and compression standards such as H.261, H.263, H.264, H.265, G711, G722, etc. Network interface 3010 can receive and transmit control and data information to/from the MCU. More information concerning the communication between the endpoint and the MCU over the relevant network and information that describing signaling, control, compression, and setting a video call can be found in the international telecommunication union (ITU) standards H.320, H.321, H.323, H.261, H.263, H.264, H.265, etc. and SIP.

Network interface module 3010 multiplexes/de-multiplexes the different signals, media and/or "signaling and control", that are communicated between the endpoint and the MCU. The compressed audio signal is transferred to and from the audio module 3020. The compressed video signal is transferred to and from video module 3050 and the "control and signaling" is transferred to and from control module 3040. Furthermore, in an embodiment in which the MCU receives user's strip commands such as but not limited to scrolling and pulling command from the endpoint, then the network interface module 3010 can be capable of handling the strip command related information that is transferred between the control module 3040 and the MCU. The strip command can be delivered inbound or outbound. Some embodiments may use the FECC channel in order to deliver the user's strip commands inbound. Yet in other embodiments the strip commands can be transferred outbound over dedicated connection, for example. The dedicated connection can be an UDP/IP connection, for example. The AVEP can send the strip commands to an associated MCU, in some embodiments the AVEP 3000 may receive from an MCU via the NI 3010 information that relates to a ROCP 100 and according to last obtained user's strip command the AVEP 3000 can build a new presented CP video image such as 150.

Audio module 3020 may receive, via network interface 3010 and the audio line, compressed mixed audio stream from the MCU. The audio module 3020 decodes the compressed mixed audio stream amplifies it and transfer the decoded mix stream toward the one or more load speakers (not shown) of the endpoint 3000. In the other direction the audio module 3020 may process the audio that is obtained from the user of AVEP 3000 by a microphone (not shown in the figures), compresses the audio signal and send the compressed audio toward an MCU via NI 3010.

Control module 3040 can be a logical unit that controls the operation of the AVEP 3000. In addition to common operation of a typical AVEP, AVEP 3000 is capable of additional functionality as result of having control module 3040. Control module 3040 can include an example of an AVEP strip controller (AVEPSC) 3042. The AVEPSC 3042 can be configured to accept the user's strip command. An example of AVEPSC 3042 can comprise an application program interface (API) for interfacing with a touch screen that is used by the AVEP or a control panel of the AVEP in order to accept the strip command such as but not limited to scroll or pull. Another API can communicate with other types of control methods such as but not limited to gaze control, hands movement control, etc.

The scroll can include the direction of the scroll left/right, for a horizontal strip, or up/down for a vertical strip. The strip command can be delivered from a touch screen by touching the screen and pull the finger to left/right (for horizontal strip) or up/down (for vertical strip). The pull command can be delivered by holding the finger on one of the segments of the strip and pulling it toward the speaker segment 115. The pull command can be associated with the coordinate of the touching point that can be processed by the AVEPSC 3042 to identify the video image that was pulled.

Accordingly a request can be sent to the MCU for replacing the source of the video image that is associated with the speaker segment 115 with the source image of the relevant segment. In other embodiments the strip command can be delivered by using the FECC channel in order to deliver the user's strip commands.

The strip command can be delivered inbound or outbound. Some embodiments may use the FECC channel in order to deliver the user's strip commands inbound. Yet in other embodiments the strip commands can be transferred outbound over dedicated connection, for example. The dedicated connection can be an UDP/IP connection, for example.

In case that a pull command was issued and a small segment was pulled from the strip toward the speaker segment 115, the AVEPSC 3042 can instruct the video module 3050 to scale the video image of the pulled segment to the size of the speaker segment 115 and reduce the size of the previous presented image of the speaker segment to the size of the small segment of the strip to be placed in the strip in the location that was associated with the pulled image. In parallel a request can be sent to the MCU 300 informing the MCU about the changes and requesting a new arrangement of ROCP video image. In response, the new arrangement of the ROCP video image can be sent.

In some embodiments of the AVEP 3000 that are configured to respond to a strip commands and adapting the presented CP video image accordingly, the processed strip command can be transferred by the AVEPSC 3042 to the video module 3050 that manipulates the obtained compressed ROCP video image according to the obtained command. Some embodiment of video module 3050 may comprise, among other elements, a decoder 3051, ROCP Frame memory (ROCPFM) 3053, an editor 3055 and a CP frame memory 3059.

At the beginning of the session and each time a change in the layout occurs the editor module 3055 can get information about the layout change from the AVEPSC 3042. Among other parameters, the information may comprise: the size in pixels of a frame of the ROCP video image (W×H) 100; the size in pixels and the location of the speaker segment 115; and the size and the location of each segment, 131-139 of the strip. Accordingly the editor 3055 can allocate a memory space for the ROCPFM 3053. An embodiment of ROCPFM 3053 can be a cyclic buffer that is adapted to store decoded video data of at least two frames of ROCP. Information regarding the allocated ROCPFM 3053 can be transferred to the decoder 3051. Compressed ROCP video image, which is obtained from the MCU 300 via NI 3010, is decoded by the decoder 3051 and be stored at the ROCPFM 3053.

In addition to the information regarding the ROCP video image 100, the editor 3055 may obtain information regarding presented CP video image 150. Among other parameters, the information may comprise: the size in pixels of a frame of the presented CP video image (W×H) 150; the size in pixels and the location of the speaker segment 115 (FIG. 1A); and the number of small segments that can be presented in the strip of the CP video image 150. Accordingly the editor 3055 can allocate a memory space for the continuous presence frame memory (CPFM) 3059. An embodiment of CPFM 3059 can be a cyclic buffer that is adapted to store decoded video data of at least two frames of the presented CP video image 150.

The editor 3055 can be configured to obtain current strip information from the AVEPSC 3042, which was created based on a last obtained strip command. The obtained current strip information can comprise the new top left and bottom right points of the current presented strip from the strip of the ROCP 100. According to the updated information about the current presented strip (133B, 135, 137, and 139B), the editor 3055 can obtain the appropriate decoded video data from the ROCPFM 3053 and place it in the appropriate addresses of the CPFM 3059. A completed frame from the CPFM 3059 can be transferred toward a display unit of the AVEP 3000 to be presented to the user of the AVEP 3000.

In some embodiments of an audio-video system in which the MCU 300 is capable to respond to the strip commands of a user and deliver a CP video image such as CP video image 150, for example. In such a system the video module of an AVEP may be similar to a video module of a common AVEP and can comprise a decoder and a CPFM. Further, the MCU of such a system 300 can comprise elements for manipulating the strip. For example, the SCU 342 can be configured to transfer information regarding the last obtained strip command to the editor 356. The editor 356 can be capable of obtaining decoded data of video images from the common interface 354 according to the strip commands and to place them in a CP video frame that matches the strip commands, such as CP 150 that is presented in FIG. 1B. The editor 356 may scale, crop, and place the video data of each of the conferees into an editor frame memory according to the location, the presented portion of a strip segment, and the size of the image in the CP layout. The size of each video image in the presented strip and the location is calculated based on strip command that is received from the SCU 342. The editor 356 is configured to build the presented CP video frame 150 in a rate that matches the presented rate of the receiving endpoint.

An example embodiment of the disclosed system in which an MCU 300 can be configured to allocate two or more streams per one receiving endpoints. Such an example MCU 300 may use two encoders. A first encoder can be allocated to encode (compress) a video image of a selected conferee that will be presented in a speaker segment, while the second encoder can be allocated to compress the video images of the conferees that are presented in the small elements along the strip. The compressed video images from both encoders can be transmitted toward a receiving endpoint.

Yet, in another example of such an MCU 300 that can send two streams to a receiving endpoint, the SCU 342 can be configured to allocated two output modules 355A,B to a receiving endpoint. One output modules 355 can handle the stream that carries the upper section with the speaker segment 115 and the padding 140 of the ROCP video image 100. While the other output module 355 can handle the strip with the video images 131-139.

In an embodiment of an MCU 300, in which two streams per receiving endpoint are used, the NI 310 can be configured to send two different compressed images (streams) according to RFC 5285 ("A General Mechanism for RTP Header Extensions") with/without RFC 5888 ("The Session Description Protocol (SDP) Grouping Framework") and with/without draft-holmberg-mmusic-sdp-bundle-negotiation-00.txt ("Multiplexing Negotiation Using Session Description Protocol (SDP) Port Numbers"), for example. By implementing those standards, the MCU 300 and an endpoint such as endpoint 400 can commence a SIP call for two or more video streams. Video streams can be bundled together on the same UDP/TCP port but also can use different ports.

Figure 4:
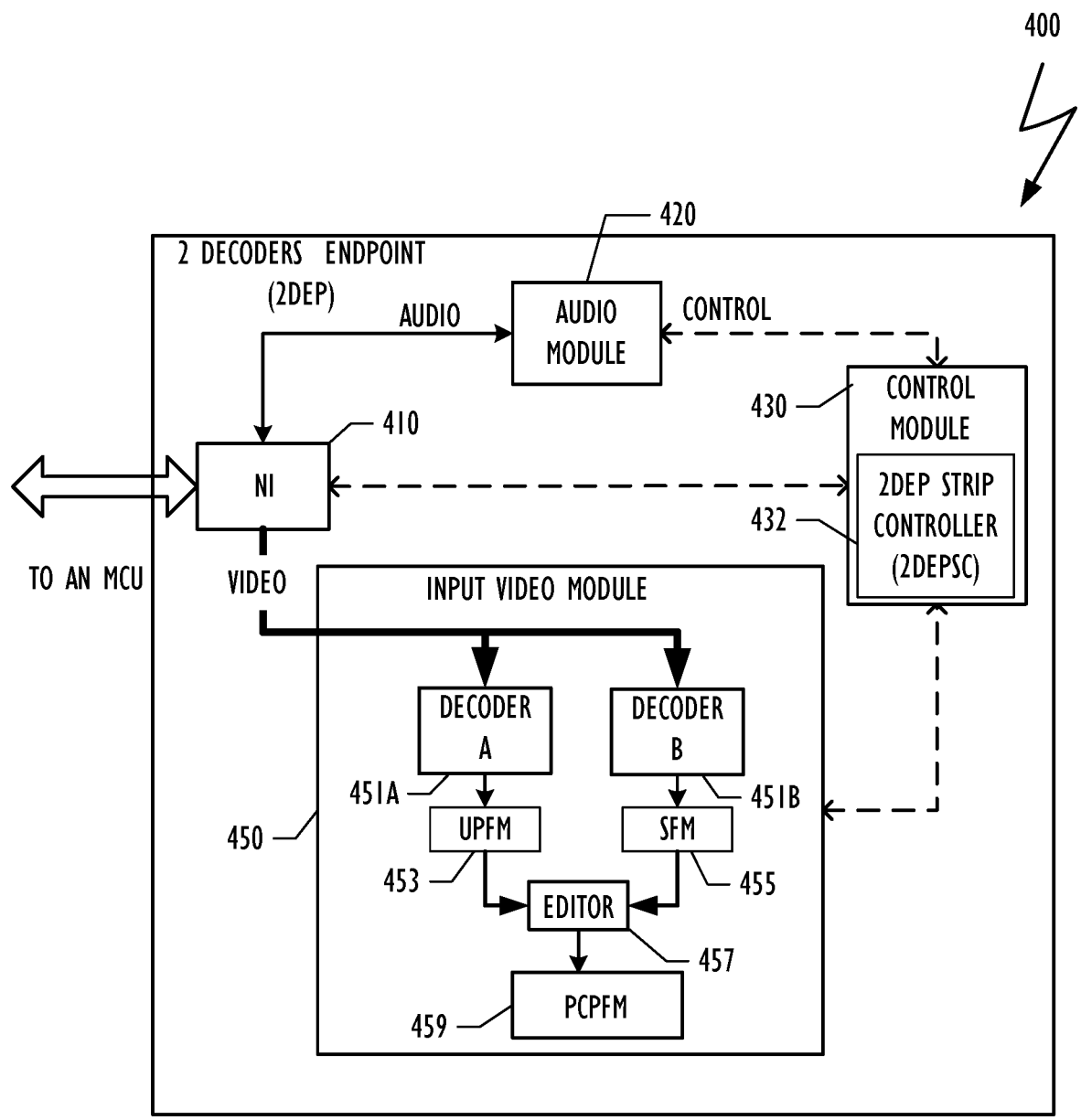
FIG. 4 depicts a block diagram with relevant elements of an example embodiment of an endpoint that uses two decoders.

Referring now to FIG. 4 that illustrates an example of an endpoint 400 in which two decoders are used, such an endpoint can be referred as 2dEP 400. An example of 2dEP 400 can be implemented in an example embodiment of a system in which the MCU 300 is configured to send two streams of compressed video that compose the ROCP video image 100. The first stream can carry the upper section of ROCP 100 with the speaker segment 115 and the padding segment 140. While the second stream can carry the strip with the compressed video images 131-139. An example embodiment of 2dEP 400 may comprise one or more processors, computer readable medium such as a read/write hard disc, CDROM, Flash memory, ROM, or other memory or storage devices, etc. Software of a logical module may be embodied on one of the computer readable medium. In order to execute a certain task, a software program may be loaded to an appropriate processor as needed.

An example of 2dEP 400 can comprise a network interface module (NI) 410, a control module 430 having a 2dEP strip controller (2dEPSC) 432, and a video input module 450. The video output module of a 2dEP operates in a similar way to a common endpoint. The operation of a common video output module of an endpoint is well known to a person with ordinary skill in the art and therefore it is not illustrated and described in details.

An example of NI 410 can be configured to implement similar tasks as NI 3010 of an AVEP 3000. In addition to those tasks NI 410 can be configured to receive two different compressed streams from an associated MCU. The two streams can comply with RFC 5285 ("A General Mechanism for RTP Header Extensions") with/without RFC 5888 ("The Session Description Protocol (SDP) Grouping Framework") and with/without draft-holmberg-mmusic-sdp-bundle-negotiation-00.txt ("Multiplexing Negotiation Using Session Description Protocol (SDP) Port Numbers"), for example. By implementing those standards, the NI 410 can obtain the two compressed video streams from NI 310 (FIG. 3A) of MCU 300 and can commence a SIP call for two or more video streams. Video streams can be bundled together on the same UDP/TCP port but also can use different ports. The obtained two streams of compressed video can be processed by the NI 410 and be de-multiplexing into two separate streams that are delivered toward the input video module 450.

An example of input video module 450 can comprise two decoders, 451A and 451B; two frame memories, upper portion frame memory (UPFM) 453 and strip frame memory (SFM) 455; an editor module 457 and a presented CP frame memory (PCPFM) 459. One of the separated stream from NI 410, that carries the compressed video of the upper section (segments 115 and 140) of the ROCP video image 100 can be targeted toward the first decoder 451a that decompresses the video image and places the decoded video data of each pixel in the appropriate address of UPFM 453. The other separated stream from NI 410, which carries the compressed video of the strip (segments 131-139) of the ROCP video image 100, can be targeted toward the second decoder 451B. The second decoder 451B decompresses the video images of the strip and places the decoded video data of each pixel of the images of the strip in the appropriate address of SFM 455. As used herein, the term upper portion refers to the ROCP that is illustrated in FIG. 1A. In other embodiments in which the strips are vertically oriented, the term can be left or right, etc.

At the beginning of the session and each time a change in the layout occurs the editor module 457 can get information about the layout change from the 2dEPSC 432. Among other parameters, the information may comprise: the size in pixels of a frame of the ROCP video image (W×H) 100; the size in pixels and the location of the speaker segment 115; and the size and the location of each segment, 131-139 of the strip. Accordingly the editor 457 can allocate a memory space for the UPFM 453 and the SFM 455. An embodiment of SFM 455 can be a cyclic buffer. Information regarding the allocated frame memories can be transferred to the decoders 451A and 451B, respectively.

In addition to the information regarding the video images of the two compressed video streams, the editor 457 may obtain information regarding the presented CP video image 150. Among other parameters, the information may comprise: the size in pixels of a frame of the presented CP video image (W×H) 150; the size in pixels and the location of the speaker segment 115; and the number of small segments that can be presented in the strip of the CP video image 150. Accordingly the editor 457 can allocate a memory space for the PCPFM 459. An embodiment of PCPFM 459 can be a cyclic buffer that is adapted to store decoded video data of at least two frames of the presented CP 150. Based on the location of the speaker segment the editor 457 can obtain the appropriate decoded video data from the UPFM 453 and place it in the appropriate addresses of the PCPFM 459.

Further, the editor 457 can be configured to obtain current strip information from the 2dEPSC 432, which was created based on a last obtained strip command. The obtained current strip information can comprise the new top left and bottom right points of the current presented strip from the strip of the ROCP 100. According to the updated information about the current presented strip (133B, 135, 137, and 139B), the editor 457 can obtain the appropriate decoded video data from the SFM 455 and place it in the appropriate addresses of the PCPFM 459. A completed frame from the PCPFM 459 can be transferred toward a display unit of the 2dEP 400 to be presented to the user of the 2dEP 400.

An example of control module 430 can be a logical unit that controls the operation of the 2dEP 400. In addition to common operation of a typical endpoint, 2dEP 400 is capable of additional functionality as result of having control module 430. Control module 430 can include an example of a 2dEP strip controller (2dEPSC) 432. The 2dEPSC 432 can be configured to accept the user's strip command. An example of 2dEPSC 432 can comprise an application program interface (API) for interfacing with a touch screen that is used by the 2dEP 400 or a control panel of the 2dEP 400 in order to accept the strip command such as but not limited to scroll or pull. Another API can communicate with other types of control methods such as nut not limited to gaze control, hands movement control, etc.

The scroll command can include the direction of the scroll left/right, for a horizontal strip, or up/down for a vertical strip. The strip command can be delivered form a touch screen by touching the screen and pull the finger to left/right (for horizontal strip) or up/down (for vertical strip). The pull command can be delivered by holding the finger on one of the segments of the strip and pull it toward the speaker segment 115, for example. The pull command can be associated with the coordinate of the touching point that can be processed by the 2dEPSC 432 to identify the video image that was pulled from the strip. Accordingly a request can be sent to the MCU for replacing the sourced of the video image that is associated with the speaker segment 115 with the source image of the relevant segment. The strip command can be delivered inbound or outbound. Some embodiments may use the FECC channel in order to deliver the user's strip commands inbound. Yet in other embodiments the strip commands can be transferred outbound over dedicated connection, for example. The dedicated connection can be an UDP/IP connection, for example.

In case that a pull command was issued and a small segment was pulled from the strip toward the speaker segment 115, the 2dEPSC 432 can instruct the editor 457 to scale the video image of the pulled segment to the size of the speaker segment 115 and reducing the size of the previous presented image of the speaker segment to the size of the small segment of the strip to be placed in the strip in the location that was associated with the pulled image. In parallel, a request can be sent to the MCU informing the MCU about the changes and requesting a new arrangement of the images in the two streams. In response, the new arrangement of video images in each stream can be sent.

In some embodiments of the 2dEP 400 that are configured to respond to a strip commands and adapting the presented CP video image accordingly, the processed strip command can be transferred by the 2dEPSC 432 to the editor 457 that manipulates the obtained decoded video images that are stored in UPFM 453 and SFM 455 according to the obtained command. More information on the operation of 2dEP 400 is disclosed below in conjunction with FIG. 6.

Figure 5:
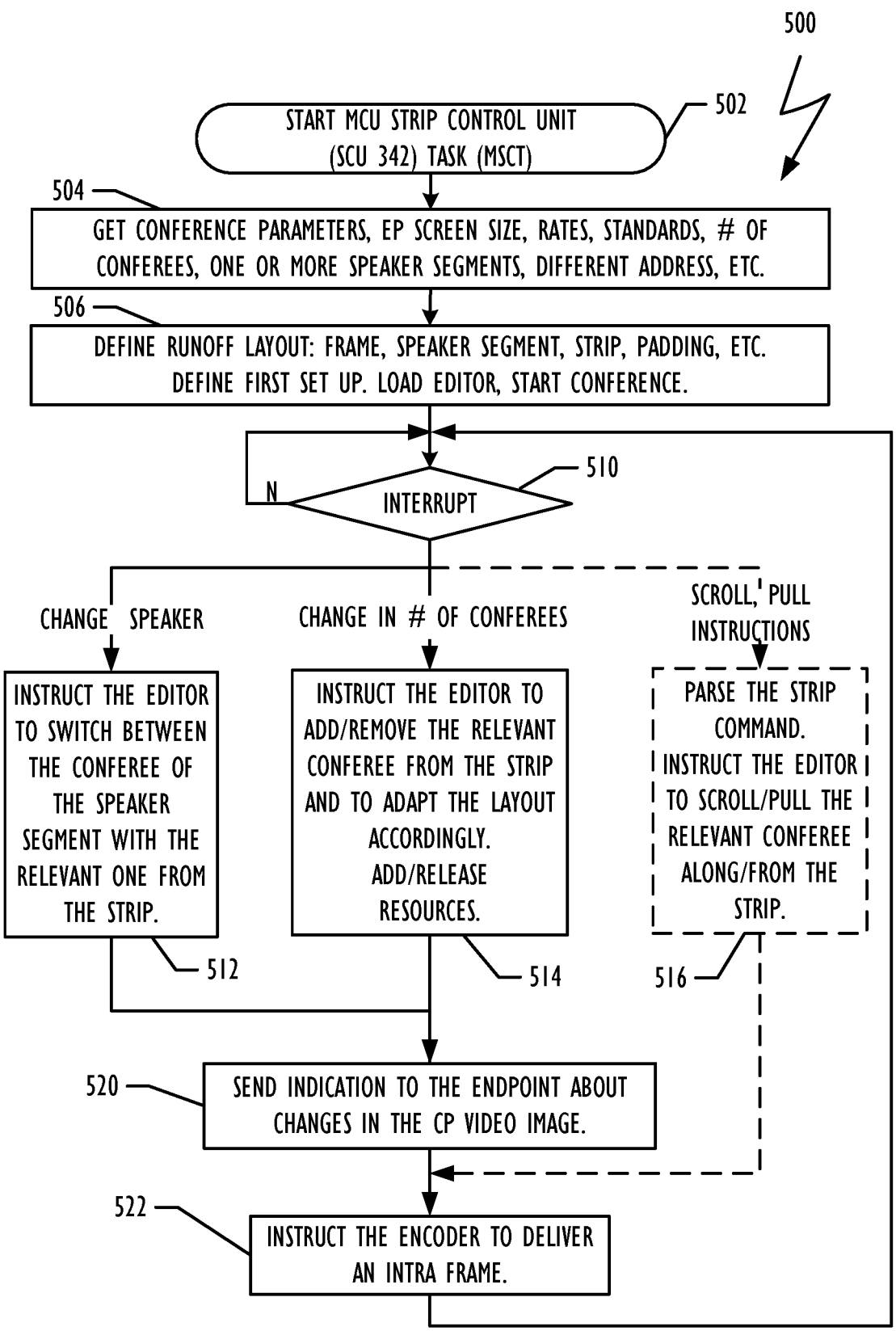
FIG. 5 is a flowchart illustrating relevant actions for composing a runoff CP video image, having a speaker segment, padding segment and a strip, at an MCU using a single decoder.

FIG. 5 illustrates a flowchart with relevant blocks of an example method 500 for composing a ROCP video image 100, having a speaker segment 115, padding segment 140 and a strip (segments 131-139) of a plurality of video images, at an MCU. The MCU can be such as but not limited to MCU 300 that uses a single encoder per a receiving endpoint. Method 500 can be implemented by SCU 342. A similar method with few modifications can be used by an MCU that has two encoders per a receiving endpoint or by an MCU that is configured to respond to a user's strip commands and deliver a presented CP video image such as the snapshot 150 of FIG. 1B. Similar method can be used by an MRM that delivers a plurality of streams, one for the speaker segment 115 and one per each video image of the strip, 131-139. The relevant modifications are mentioned in association with the description of the relevant blocks of FIG. 5.

Method 500 can be initiated 502 by an example of SCU 342 at the beginning of a video conference session. Upon initiation, process 500 can obtain 504 parameters that are related to the conference. Parameters such as but not limited to: number of conferees, the screen size in W×H pixels, the number of speaker segments, the number of segment in the strip, the height of each segment in the strip, the addresses of the relevant endpoints, compression parameters, etc.

The obtained information can be processed 506 in order to define the parameters of the ROCP video image 100. Parameters such as but not limited to: the size of the ROCP video image, the location and size of the different segments, etc. The height of the ROCP video image can match the height of the receiving endpoint display unit. Based on the required height of a segment of the strip, the number of pixels in the width can be calculated. Base on the calculated width of a segment of the strip and number of segment, the width of the strip can be calculated and can be used to define the width of the ROCP 100.

Accordingly, the size and the location of the top left corner of the padding segment 140 can be calculated. After calculating 506 all the parameters of the layout, the first setup can be defined. The setup can include information such as but not limited to: which transmitting endpoint is selected to be placed in the speaker segment 115, which endpoint will be placed in the first segment 131 of the strip, and so on. This information can be delivered 506 to the editor 357 as well as to the relevant AVEPSC 3042 via the NI 310 of the MCU and the NI 3010 of the receiving endpoint. For embodiments of MCU that has two encoders, or can respond to user's strip command, or for an MRM, the process of block 506 can be modified to exclude the padding segment. Next the conference session can be initiated 506 by requesting an Intra frame from each participating endpoint and method 500 can wait 510 for an interrupt that is relevant to the strip.

Three examples of relevant interrupts are illustrated in FIG. 5, a change in the speaker interrupt, a change in the number of conferees and a strip commands was received. The first and the second interrupts reflect changes that occur automatically in response to changes in the videoconferencing session. Those changes are real-time changes that reflect the dynamic of a real-time communication session. The third one is related to an embodiment in which the MCU is configured to respond to strip commands. The strip command can comprise scroll or pull, for example.

The obtained interrupt is parsed 510 and process 500 can proceed based on the type of the interrupt. In case that the interrupt indicates a speaker change, then in block 512 the SCU 342 can instruct the editor 356 to switch between the conferee that is currently placed in the speaker segment 115 with the image of the conferee from the strip that is the new selected speaker. Accordingly the editor 356 constructs the new ROCP video image. Next at block 520 an indication can be sent to the AVEPSC 3042 of the receiving endpoint informing it about the changes. Then, an instruction to encode an Intra frame of ROCP can be sent 522 to the encoder 358 and method 500 can return to block 510 waiting for the next interrupt. Some embodiments may not request an Intra frame and allow the encoder to determine how to encode the next frame.

In case 510 that the interrupt indicates a change in the number of conferees, then in block 514 the SCU 342 can instruct the editor 356 to remove or add the relevant conferee to the strip. Further, the SCU 342 can allocate or release the relevant resources (input/output modules, 351A-C and 355A-C respectively) that are associated with the relevant conferee. The editor 356, in response to the SCU 342 command, constructs the new ROCP video image. Next at block 520 an indication can be sent to the AVEPSC 3042 of the receiving endpoint informing it about the changes and an instruction to encode an Intra frame of ROCP can be sent 522 to the encoder 358 and method 500 can return to block 510 waiting for the next interrupt. Some embodiments may not request an Intra frame and allow the encoder to determine how to encode the next frame.

In an embodiment in which the MCU 300 is configured to respond to strip commands, then when 510 the interrupt indicates that a strip command (scroll or pull, for example) was received, then in block 516 the SCU 342 can employ an API program to obtain and parse 516 the strip command. After parsing the command, the SCU 342 can calculate the new setting, top left and bottom right, of the strip and accordingly instruct the editor 356 to remove or add the relevant conferee to the strip in order to create the presented snapshot 150. The editor 356, in response to the SCU 342 command, constructs the new presented CP video image 150. Next, an instruction to encode an Intra frame of ROCP can be sent 522 to the encoder 358 and method 500 can return to block 510 waiting for the next interrupt. Some embodiments of method 500 may not request an Intra frame and allow the encoder to determine how to encode the next frame.

Figure 6:
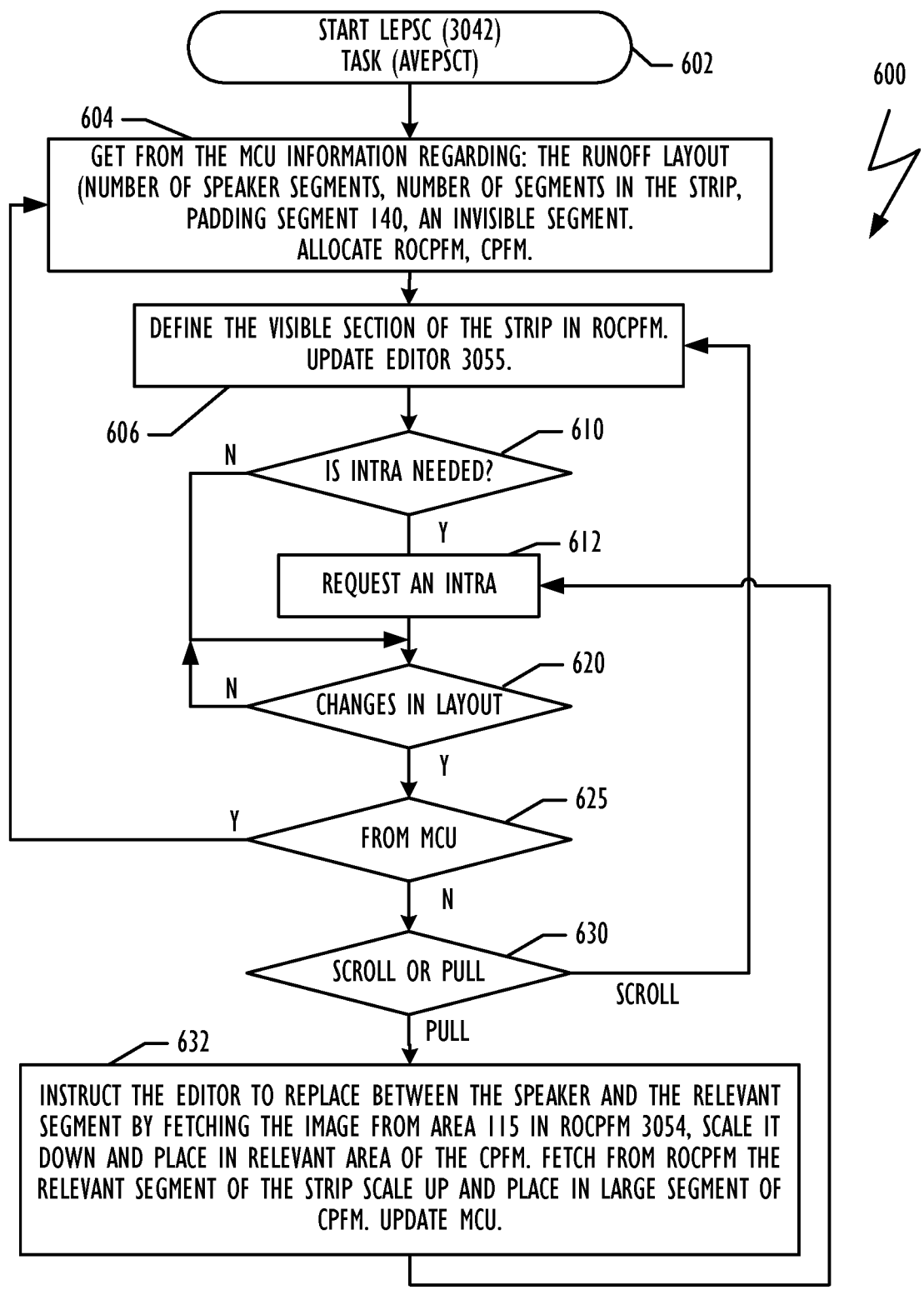
FIG. 6 is a flowchart illustrating relevant actions for composing a CP video image, having a speaker segment and a strip at a receiving endpoint using a single decoder.

FIG. 6 illustrates a flowchart with relevant processes of an example method 600 for creating a presented CP video image, such as but not limited to snapshot 150, in response to a user strip command. Method 600 can be implemented by AVEPSC 3042. Method 600 can be used in embodiments in which the MCU was configured to use a single encoder per receiving endpoint, MCU such as but not limited to MCU 300. A similar method with few modifications can be used by a 2dEPSC 400 that has two decoders while the MCU has two encoders per a receiving endpoint. Further, a similar method with few modifications can be used by an MRE that receives a plurality of streams, one per the speaker segment 115 and one per each segment of the strip, 131-139. In such embodiment, the number of decoders 451A-B and FMs 453-455 can reflect the number of segments (speakers and in the strip). The relevant modifications are mentioned in association with the description of the relevant blocks of FIG. 6.

Method 600 with few modifications can be used by some embodiments of a video conferencing system in which the MCU respond to the user strip command and manipulated the video accordingly. In such embodiment the MCU can use the modified method 600 and delivers the presented CP video image, such as but not limited to snapshot 150 and the receiving endpoint handles the received compressed CP video image in a common way as regular CP video image.

Method 600 can be initiated 602 by an example of AVEPSC 3042 at the beginning of a video conference session and may run as long as the conference session is active. Upon initiation, process 600 can obtain 604 from the MCU parameters that are related to the conference. Parameters such as but not limited to: the size of the ROCP frame in W×H pixels, the number of speaker segments 115, the number of segment in the strip 131-139, the height of each segment in the strip, the size and location (top left corner) of the padding segment 140, compression parameters, information about the one or two invisible sections, on the left and/or right sides of the strip in the currently presented CP video image, etc. Based on the obtained information the relevant editor module (3055, or 457 or 356) can be updated and accordingly can allocate 604 the required frame memories modules (3053&3059 or 453&455, respectively).

The obtained information can be further processed 606 for preparing one or more transformation functions that can be used, by an editor module 3055 that composes the presented CP video image, to transform between the location (the coordinates of the top left corner and the size) of each segment in the ROCP video image 100 and the location of that segment in the currently presented CP video image 150 as well as for defining the invisible and visible sections of the strip. The obtained information can include the W coordinate of the top left corner of a segment where part of it, or the entire segment, belongs to the left invisible portion of the strip. The W coordinate can have a negative value. The negative value can be calculated 606 by the AVEPSC 3042 or the 2dEPSC 432 (depending on the type of the endpoint) based on a received strip command from the user after being processed by the appropriate API.

The editor 3055 or 457 or 356 that constructs the presented CP video image (the editor of the AVEP 3000, or the 2dEP 400 or the MCU 300, respectively, depending on the embodiment of the system) may use the negative value in order to determine from which address of the ROCPFM 3053, or UPFM 453 and SFM 455, or the common interface 354, respectively, to fetch the decoded data in order to compose the presented CP video image while keeping the flowing of the video images in each of the segments of the composed presented CP video image.

Next a decision can be made 610, whether an Intra frame is needed. An Intra frame can be needed in case that the strip command is pulling one of the strip segments 131-139 toward the speaker segment 115, for example. If 610 an Intra is needed, then process 600 proceed to block 612 and sends an Intra request to ward the encoder of the MCU. If 610 an Intra is not needed, the strip command was scrolling the strip to the left or to the right, for example, then process 600 can proceed to block 620 and waits for an interrupt that indicates a change in the layout interrupt. Yet, some embodiments of method 600 may not request an Intra frame and allow the encoder to determine how to encode the next frame.

Upon 620 receiving an interrupt that a change in the layout occurred, then a decision is made, whether 625 the change was issued by the MCU, a speaker was changed, a change in the number of conferees, etc. Those changes reflect changes that occur automatically in response to changes in the videoconferencing session. Those changes are real-time changes and reflect the dynamic of a real-time communication session. If 625 the changed was issued by the MCU in response to the dynamic of the communication session, process 600 can return to block 604 and obtains information about the change. In case 625 that the change in the layout interrupt was issued by an API that is configured to obtain and process the user strip command, then a decision can be made 630 whether the strip command is scroll or pull. If 630 the strip command was scroll than process 600 can return to block 606 to define the new visible and invisible portions of the strip and accordingly calculate the new coordinates of the top left corner of each segment in the strip.

If 630 the strip command is pull, then at block 632, in some embodiments of the disclosed method 600 that are configured to accelerate the response to a strip command, a pull request can be responded by an instruction to the relevant editor (3055 or 457) to replace between the sources of the speaker segment 115 and the pulled segment from the strip, while scaling down the image of the previous speaker to the size of the relevant strip segment. In addition the video image that was pulled from the strip can be scaled up by the editor and be placed in the speaker segment 115. In addition the MCU can be informed 632 about the change in the layout and a request to an Intra frame can be sent 612 to the encoder of the MCU and method 600 can proceed as long as the conference is active. Some embodiments of method 600 may not request an Intra frame and allow the encoder to determine how to encode the next frame. The describe process 600 enables responding to the strip command while keeping the flowing of the video images in each of the segments of the composed SCVI.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A method for composing a continuous presence videoconferencing layout for a videoconferencing session, the method comprising:
receiving a plurality of video streams;
placing video from each of a subset of the plurality of video streams into a respective strip video segment of a plurality of strip video segments of the continuous presence videoconferencing layout; and
displaying the plurality of video streams in the continuous presence videoconferencing layout on a display unit of a video device,
wherein a first portion of a strip video segment of the plurality of strip video segments is visible on the display unit of the video device to allow a user to interact with the first portion of the strip video segment, and
wherein a second portion of the strip video segment is invisible on the display unit of the video device.

2. The method of claim 1, wherein displaying the plurality of video streams comprises:
displaying a first video stream of the plurality of video streams in a main segment of the continuous presence videoconferencing layout using a first set of video parameters; and
displaying the subset of the plurality of video streams in the plurality of strip video segments using a second set of video parameters, wherein the second set of video parameters differs from the first set of video parameters.

3. The method of claim 2, wherein a frame rate parameter of the first set of video parameters differs from a frame rate parameter of the second set of video parameters.

4. The method of claim 2, wherein a compression parameter of the first set of video parameters differs from a compression parameter of the second set of video parameters.

5. The method of claim 2, wherein the first video stream corresponds to a current speaker in a videoconferencing session.

6. The method of claim 1, wherein displaying the plurality of video streams comprises:
wherein the video device is a videoconferencing endpoint; and
wherein the plurality of video streams are received from a plurality of videoconferencing endpoints of the videoconferencing session.

7. The method of claim 1, further comprising:
receiving a user command;
moving a first video stream from a main segment of the continuous presence videoconferencing layout to a strip video segment of the plurality of strip video segments responsive to the user command; and
moving a second video stream from the strip video segment to the main segment, responsive to the user command.

8. The method of claim 7, wherein the user command comprises:
pointing to the strip video segment; and
pulling the second video stream toward the main segment.

9. The method of claim 1,
wherein displaying the plurality of video streams in the continuous presence videoconferencing layout on a display unit of a video device comprises displaying a first video stream of the plurality of video streams in a main segment of the continuous presence videoconferencing layout and the plurality of strip video segments as a user scrollable strip along an edge of the main segment;
further comprising:
receiving a user command; and
scrolling the plurality of strip video segments in the strip without affecting the main segment of the continuous presence videoconferencing layout.

10. The method of claim 9, wherein the strip has a dimension greater than a corresponding dimension of the display unit.

11. The method of claim 9, wherein the user command comprises dragging a strip video segment in a direction.

12. The method of claim 11,
wherein the strip has a horizontal orientation, and
wherein the direction is left or right.

13. The method of claim 11,
wherein the strip has a vertical orientation, and
wherein the direction is up or down.

14. The method of claim 1, further comprising:
scaling the subset of the plurality of video streams according to a frame size of the plurality of strip video segments, and
scaling a first video stream according to a frame size of a main segment of the continuous presence videoconferencing layout.

15. An apparatus, comprising:
a compressed video data interface; and
a plurality of video output modules, each associated with a display unit of a receiving video device and configured to:
receive a plurality of video streams;
place video from each of a subset of the plurality of video streams into a respective strip video segment of a plurality of strip video segments of a continuous presence videoconferencing layout; and
display the plurality of video streams in the continuous presence videoconferencing layout on a display unit of a video device,
wherein a first portion of a strip video segment of the plurality of strip video segments is visible on the display unit of the video device to allow a user to interact with the first portion of the strip video segment, and
wherein a second portion of the strip video segment is invisible on the display unit of the video device.

16. The apparatus of claim 15, wherein the plurality of video output modules are configured to display the plurality of video streams by being configured to:
display a first video stream of the plurality of video streams in a main segment of the continuous presence videoconferencing layout using a first set of video parameters; and
display the subset of the plurality of video streams in the plurality of strip video segments using a second set of video parameters, wherein the second set of video parameters differs from the first set of video parameters.

17. The apparatus of claim 16, wherein a frame rate parameter of the first set of video parameters differs from a frame rate parameter of the second set of video parameters.

18. The apparatus of claim 16, wherein a compression parameter of the first set of video parameters differs from a compression parameter of the second set of video parameters.

19. The apparatus of claim 15, wherein each of the plurality of video output modules is further configured to:
swap video streams between a main segment of the continuous presence videoconferencing layout and a strip video segment of the plurality of strip video segments responsive to a user command.

20. The apparatus of claim 15, wherein each of the plurality of video output modules is further configured to:
scroll the plurality of video strip segments without affecting a main segment of the continuous presence videoconferencing layout, responsive to receipt of a user scrolling command.

* * * * *